Figure 3:
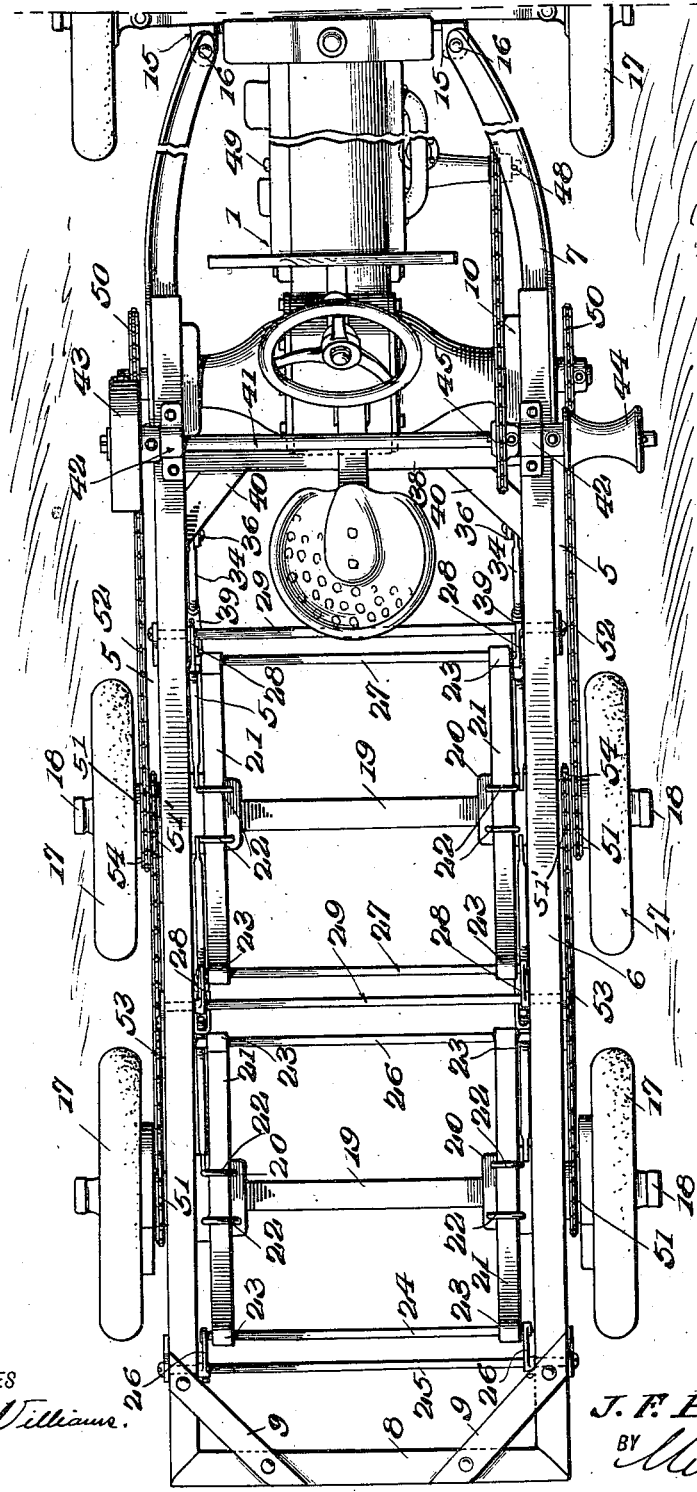

Jan. 1, 1924
J. F. BAILEY
1,479,422
DEMOUNTABLE ATTACHMENT FOR TRACTORS
Filed July 24, 1922  2 Sheets-Sheet 1
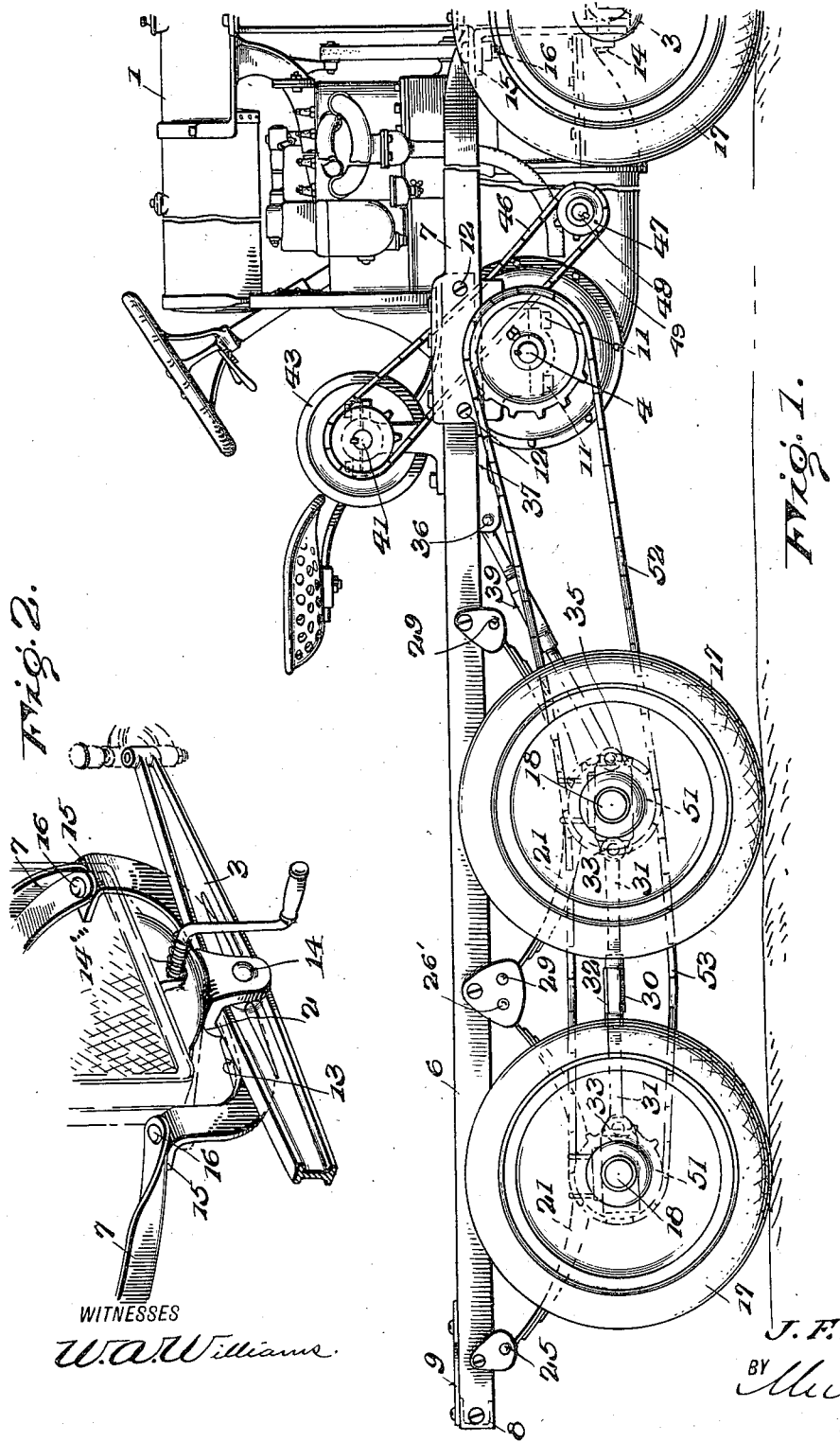
WITNESSES
W. A. Williams
INVENTOR
J. F. Bailey.
BY
ATTORNEYS Jan. 1, 1924

J. F. BAILEY

DEMOUNTABLE ATTACHMENT FOR TRACTORS

Filed July 24, 1922

1,479,422

2 Sheets-Sheet 2

WITNESSES
W. A. Williams.

INVENTOR
J. F. Bailey.
BY
ATTORNEYS

Patented Jan. 1, 1924.

1,479,422

UNITED STATES PATENT OFFICE.

JAMES F. BAILEY, OF COLUMBIA, SOUTH CAROLINA.

DEMOUNTABLE ATTACHMENT FOR TRACTORS.

Application filed July 24, 1922. Serial No. 577,153.

*To all whom it may concern:*

Be it known that I, JAMES F. BAILEY, a citizen of the United States, and resident of Columbia, in the county of Richland and State of South Carolina, have invented certain new and useful Improvements in Demountable Attachments for Tractors, of which the following is a specification.

This invention relates to a demountable attachment for tractors having the general form of a running gear construction of a truck adapted to support heavy articles, whereby articles may be transported by a tractor equipped with my invention in the same manner as such articles would be ordinarly transported in automotive trucks of conventional construction.

A further object of my invention is to provide an attachment of the character described which is adapted to be detachably secured to tractors of ordinary types of construction without any extensive changes being required in the construction of the tractor and to then track properly with the tractor, without appreciably retarding the progress of the latter.

A further object of my invention is to provide in an attachment of the character described a frame adapted to be attached to fixed parts of a tractor, wheels for supporting the frame, and a novel spring suspension arrangement for mounting the frame upon the wheels.

A still further object of the invention is to provide in an attachment of the character described a power take-off arrangement, from which power may be transmitted to desirable places for use as desired.

Other objects and advantages will be apparent from the following description, and the novel features of the invention will be particularly outlined in the appended claims.

A practical embodiment of the invention is illustrated in the accompanying drawings, forming a part of this application, in which—

Figure 1 is a side elevation of a tractor of a well known type of construction equipped with the attachment, portions of the tractor being broken away, Figure 2 is a fragmentary perspective view of the front portion of the structure shown in Figure 1, illustrating the manner of detachably securing the frame of the attachment to the tractor, Figure 3 is a top plan view of the structure shown in Figure 1.

Referring now to the drawings, a tractor of a well known type of construction is indicated generally at 1 and includes the usual front suspension frame 2 to which a front axle 3 is attached and the usual rear or drive axle 4.

An attachment embodying the invention, as illustrated, comprises a frame consisting of a pair of spaced apart longitudinal members 5—5, each of which consists of a rear section 6 and a front section 7, and a cross member 8 connecting the side members at the rearward extremities of the rear sections 6—6. The side members 5—5 may be stayed to the cross member 8 through the agency of diagonal bars 9—9.

The rear sections 6—6 of the side frame members are preferably of channel formation and are arranged with the flanged portions thereof horizontally disposed and extending toward each other. Each of the front sections 7 of the side frame members preferably has the form of an angle bar and is arranged with one leg thereof vertically disposed while the other leg rests adjacent to its rearward end upon a block 10 which may be a part of the housing of the rear axle of the tractor. The blocks 10 upon which the respective front sections 7—7 of the side frame members of the attachment rest are located adjacent to the opposite ends of the housing of the tractor drive axle 4 and the sections 7—7 are rigidly secured to such blocks by means of bolts 11 or like fastening devices. The forward end portions of the sections 6—6 rest upon the horizontal flanges of a portion of the sections 7—7 which are superimposed upon the blocks 10 and in contiguous relation to the inner walls of the vertical flanges of such portions, being secured to both horizontal and vertical flanges of the said portions of the front sections 7—7 by means of bolts. The bolts which secure the lowermost horizontal flange of the channel-shaped rear sections 6—6 to the underlying leg of the front sections 7—7 may be the bolts 11 which secure the front sections to the blocks 10, and the bolts which secure the vertical web portion of the rear sections to the vertical flanges of the front sections of the side frame members are designated 12. Obviously, other fastening devices than the bolts illustrated may be used to effect the connection of the front and rear sections of the side frame members.

As best seen in Figures 1 and 2, a substantially U-shaped yoke 13 is provided by my invention as the connection between the forward ends of the sections 7—7 of the side frame members and the front suspension frame of the tractor. The web portion of the U-shaped yoke or connector is pivotally attached intermediately to the suspension member 2, as at 14 at the rear of the front axle 3 so that the web portion of the yoke extends transversely of the tractor and the arms thereof extend upwardly at opposite sides of the radiator 14' of the tractor, being bent rearwardly adjacent to their upper ends to provide horizontally disposed attaching portions 15—15 which underlie the front end portions of the sections 7—7 and to which the latter are secured by bolts 16 or like fastening devices. The forward sections 7—7 of the side frame members converge from their points of juncture with the rear sections 6—6 toward their points of juncture with the attaching portions 15.

The frame of the attachment is movably supported upon ground wheels 17, there being a wheel 17 secured at each end of an axle or axles 18.

While I have illustrated the attachment as including two of the axles 18 and two pairs of the ground wheels 17, it will be apparent that I may support the frame of the attachment upon one pair of the ground wheels 17 or may employ a greater number of pairs of ground wheels 17 than that shown without departing from the spirit and scope of the invention.

Each of the axles 18 extends through an axle housing 19 having blocks 20—20 secured thereon adjacent to the inner portions of the side frame members. A pair of semi-elliptical leaf springs 21 are provided for each of the axle housings 19 and each leaf spring 21 is secured intermediately by shackle bolts 22 or the like in superimposed relation to one of the blocks 20. The end portions of the springs 21 diverge outwardly and upwardly in respect to each other and have clip portions 23 at their outer ends.

In the embodiment of the invention illustrated, the clip portions 23 at the rearward ends of the rearmost pair of spring members 21 are journals for a suspension rod 24 which extends transversely of the frame and is swingingly supported adjacent to its opposite ends upon a fixed suspension member 25 by means of suspension links 26.

The ends of the fixed suspension rod 25 are supported by the side frame members of the attachment. The portions 23 at the forward ends of the rearmost pair of spring members constitute journals for a suspension rod 26' which is arranged to lie in the plane of the fixed suspension rod 25 and has its ends supported by the side members of the frame of the attachment.

The clip portions at both the rearward and forward ends of the forward pair of spring members 21 serve as journals for holding suspension rods 27 which are swingingly supported by suspension links 28 upon fixed rods 29 lying in the plane of the rods 25 and 26' and also having their end portions supported by the side members of the frame.

With the organization described, the frame of the attachment will be flexibly supported above the axle housings 19 and in spaced relation thereto, whereby shocks and jars occasioned by inequalities of road surface and communicated to the axle housings will be dissipated to a considerable extent without being transmitted to the frame. The ground wheels 17 may be equipped with pneumatic or solid tires, as preferred. The axle housings 19 are spaced apart when two of these housings are provided by means of thrust bars 30, each of which comprises two axially aligned sections 31—31 adjustably connected by a turnbuckle 32 and having their remote ends pivotally attached to ears 33 extending laterally of the proximate or confronting sides of the blocks 20. Struts 34 are pivotally attached at their rearward ends to inwardly extending ears 35 on the forward sides of the blocks 20 on the foremost axle housing. The struts 34 are pivotally attached at their forward ends to rearwardly extending ears 36 which are formed integrally with blocks 37 secured to the under sides of the sections 6—6 of the side frame members adjacent to the juncture of the latter with a cross frame member 38. The struts 34 may comprise axially aligned sections adjustably connected by turn buckles 39. The cross frame member 38 is preferably stayed to the sections 6—6 of the side frame members of the frame by diagonally extending braces 40.

A transversely extending rotatable shaft 41 is supported upon the frame in brackets or bearings 42 secured upon the sections 6—6 of the side frame members adjacent to the forward ends thereof and in superimposed relation thereto. The shaft 41 is provided at its one end with a fly wheel 43 secured thereto and at its other end with a drum 44 or other known device for transmitting power from the shaft 41 to a determined place. A sprocket 45 secured to the shaft 41 is driven by a chain connection 46 from a sprocket 47 secured upon a rotating part 48 of an engine 49 which constitutes a part of the tractor 1.

When an attachment embodying the invention is applied to a tractor, the rear ground or drive wheels of the tractor are removed and power is transmitted from the engine of the tractor to the wheels 17 of the attachment to effect propulsion of the tractor and attachment thereto as a unit. To this end, sprockets 50 are secured to the rear or drive axle 4 of the tractor adjacent to the opposite ends thereof. Sprockets 51 are secured to the axles 18 at opposite sides of the frame of the attachment. Chains 52 are trained about the sprockets 50 and the sprockets 51 at the ends of the foremost axle 18. Chains 53 are trained about the sprockets 51' on the rearmost axle 18 and about other sprockets which are secured to the foremost axle 18.

Obviously, any other known transmission means may be employed to transmit power from the engine 49 or rather from the rear axle 4 of the tractor to the axle or axles 18 in lieu of the sprocket and chain arrangement described. However, the sprocket and chain arrangement described and illustrated is preferred by me at present.

From the foregoing description of the various parts of the device, the operation of the same may be readily understood. A tractor may be employed in the transportation of loads ordinarily requiring the use of a truck when an attachment embodying my invention is applied thereto, in the manner described. Since the attachment is demountable, the tractor may be used in performing the functions for which originally provided when not being used in the transportation of materials. Any suitable body, none being shown, may be supported upon the frame of the attachment and power may be transmitted from the power take off drum 44 to tilt a body and dump the load thereof if the body is pivotally attached to the frame of the attachment, as is usual in trucks of conventional construction.

The attachment may be provided with any suitable known braking arrangement for use when required, none being shown.

While I have shown the attachment as being applied to a tractor of the Fordson type of construction, it will be understood that the attachment may be operatively applied to tractors of other types of construction, without any material changes in the construction of such attachment being required. I therefore do not care to be restricted to the form of the device illustrated in the attached drawings, but consider as my own all modifications and adaptations thereof which fairly fall within the scope of the appended claims.

Having thus described the invention, what I claim is:—

1. A demountable attachment for tractors comprising a frame including side members having forward end portions adapted to extend forwardly of the rear portions of a tractor and converging toward each other at their forward ends, means connecting with the forwardly extending portions of the side members of the frame at the forward ends thereof for detachably securing such forwardly extending portions to a fixed part of the tractor, an axle housing extending transversely of the frame substantially intermediate of the length of the latter, spring suspension means connecting the axle housing with the side members of the frame, an axle journaled in the housing and having the end portions thereof projecting beyond the ends of the housing, wheels secured to the end portions of the axle for movably supporting the frame to track with the tractor, a transversely extending shaft rotatably supported upon the frame of the attachment, a power transmission device secured to the shaft, and other transmission means having connection with the shaft and being adapted for engagement with a driven part of the tractor to effect rotation of the shaft.

2. The combination with a tractor of a frame comprising horizontally disposed side members including front end portions extending beyond the rearward end of the tractor at opposite sides thereof, means connecting with the forwardly extending end portions of the side members of the frame and connecting said end portions with a fixed part of the tractor, an axle disposed transversely of the frame, spring suspension means for supporting the frame upon the axle, wheels mounted upon the axle adjacent to the ends thereof, power transmitting elements mounted upon the drive axle of the tractor and replacing the usual drive wheels of the tractor, power transmission elements, associated with the wheels of the tractor and being adapted to co-operate with the first named power transmission elements, and means connecting each of said first named power transmission elements with one of said second named power transmitting elements for imparting a torque from the former to the latter.

3. A demountably supported attachment for tractors comprising a frame mounted upon wheels and having side members adapted to extend forwardly of the rear end of the tractor along opposite sides thereof and to converge toward each other at their forward ends, a substantially U-shaped yoke adapted for attachment intermediately to the front suspension structure of the tractor, said yoke having upwardly and outwardly diverging arms provided with rearwardly extending horizontal end portions underlying the forward end portions of the side members of the frame and being secured to the latter and other means securing the side frame members of the attachment to fixed parts of the tractor at appreciable distances rearwardly of the forward extremities of the side frame members.

4. A demountably supported attachment for tractors comprising a frame mounted upon wheels and having side members adapted to extend forwardly of the rear end of the tractor along opposite sides thereof and to converge toward each other at their forward ends, and a substantially U-shaped yoke adapted for attachment intermediately to the front suspension structure of the tractor, the arms of the yoke being adapted for connection with the side members of said frame.

JAMES F. BAILEY.